United States Patent
Fang

(10) Patent No.: US 10,493,810 B2
(45) Date of Patent: Dec. 3, 2019

(54) DIAGONAL BEADS CHAIN MINUS STRESS BUCKLE AND THE DIAGONAL BEADS CHAIN

(71) Applicant: DEQING GENERAL INDUSTRY CO., LTD., Huzhou, Zhejiang (CN)

(72) Inventor: Ding Fang, Zhejiang (CN)

(73) Assignee: DEQING GENERAL INDUSTRY CO., LTD., Huzhou (CN)

( * ) Notice: Subject to any disclaimer, the term of this patent is extended or adjusted under 35 U.S.C. 154(b) by 21 days.

(21) Appl. No.: 15/744,352

(22) PCT Filed: Oct. 18, 2016

(86) PCT No.: PCT/CN2016/102401
§ 371 (c)(1),
(2) Date: Jan. 12, 2018

(87) PCT Pub. No.: WO2018/072088
PCT Pub. Date: Apr. 26, 2018

(65) Prior Publication Data
US 2019/0070913 A1    Mar. 7, 2019

(51) Int. Cl.
*B60C 27/08* (2006.01)
*B60C 27/06* (2006.01)

(52) U.S. Cl.
CPC ............ *B60C 27/08* (2013.01); *B60C 27/062* (2013.01); *B60C 27/067* (2013.01)

(58) Field of Classification Search
CPC ..... B60C 27/06; B60C 27/062; B60C 27/066; B60C 27/067; B60C 27/08; B60C 27/10
See application file for complete search history.

(56) References Cited

U.S. PATENT DOCUMENTS

| 4,366,849 A | 1/1983 | Martinelli |
| 4,366,850 A * | 1/1983 | Coutts .................... B60C 27/06 |
| | | 152/222 |

(Continued)

FOREIGN PATENT DOCUMENTS

| CN | 1623810 A | 5/2010 |
| CN | 202806248 U | 3/2013 |

(Continued)

OTHER PUBLICATIONS

International Search Report and Written Opinion for corresponding PCT International Application No. PCT/CN2016/102401, pp. 1-23.

*Primary Examiner* — Kip T Kotter
(74) *Attorney, Agent, or Firm* — Hauptman Ham, LLP

(57) ABSTRACT

An automotive tire non-skid device for snowfields to increase adhesion to pavement covered with ice or snow, in particular to a diagonal bead chain stress reducing pinch plate and a diagonal bead chain. Through configuration of stress reducing pinch plates and stress reducing transition chains disposed on two sides of a second connecting assembly, concentrated stress at the connector roots of steel cables of the stress reducing transition chains are isolated, dispersed and relieved, and the service life of the steel cables are prolonged. At the same time, the present invention has the advantages of simple structure, stable performance, convenient modification and low manufacturing cost.

8 Claims, 3 Drawing Sheets

(56) References Cited

U.S. PATENT DOCUMENTS

| | | | | |
|---|---|---|---|---|
| 5,056,574 A * | 10/1991 | Maresh | ................ | B60C 27/10 |
| | | | | 152/233 |
| 5,236,025 A * | 8/1993 | Maresh | ................ | B60C 27/10 |
| | | | | 152/219 |
| 5,299,613 A * | 4/1994 | Maresh | ................ | B60C 27/10 |
| | | | | 152/221 |
| 6,035,912 A * | 3/2000 | Clark | ................ | B60C 27/08 |
| | | | | 152/222 |
| 6,085,816 A * | 7/2000 | Clark | ................ | B60C 27/22 |
| | | | | 152/219 |
| 6,725,894 B2 * | 4/2004 | Clark | ................ | B60C 27/22 |
| | | | | 152/217 |
| 7,080,674 B2 * | 7/2006 | Clark | ................ | B60C 27/06 |
| | | | | 152/219 |
| 2012/0132329 A1 * | 5/2012 | Hanson | ................ | B60C 27/08 |
| | | | | 152/208 |

FOREIGN PATENT DOCUMENTS

| | | |
|---|---|---|
| CN | 206106838 U | 4/2017 |
| JP | H10138721 A | 11/1999 |
| JP | 2002301918 A | 4/2006 |

* cited by examiner

DIAGONAL BEADS CHAIN MINUS STRESS BUCKLE AND THE DIAGONAL BEADS CHAIN

RELATED APPLICATIONS

The present application is related to Chinese Application Number ZL201621131012.9, filed on Oct. 18, 2016, the disclosure of which is hereby incorporated by reference herein in its entirety.

BACKGROUND OF THE INVENTION

1. Technical Field

The present invention relates to an automotive tire non-slip device for snowfields to increase adhesion to roads covered with ice or snow, in particular to a diagonal angle pearl chain subtracts stress buckle and a diagonal angle pearl chain, to prolong the service life of steel cables.

2. Description of Related Art

An invention patent, publication No. CN 1623810 B, published on May 12, 2010, discloses a low-interference traction device for tires, and provides a design solution for a non-slip tire chain. The chain is fixed on both the inner side and outer sides of the tire and can be adapted to small clearances without sacrificing the strength and integrity of the non-slip chain. The transition chain of the non-slip chain consists of a steel plate or a steel wire coiled ball, a steel cable and a bead. The transition bead and a lateral chain (rope) are connected through a pinch plate. When a vehicle is running or a bead chain is in use, the steel plate or the steel wire coiled ball reacts with the steel cable, so the steel cable tends to break. In such circumstances, the use effect of the anti-slip chain is affected, the service life of the steel cable is reduced, and if the rupture occurs when the vehicle is running at a high speed, damage to the vehicle or traffic accidents may be caused.

BRIEF SUMMARY OF THE INVENTION

Based on the above technical problems, the present invention provides a diagonal angle pearl chain subtracts stress buckle for effectively relieving extrusion on a bead by a ball, and a diagonal angle pearl chain, to prolong the service life of the steel cable.

The diagonal angle pearl chain subtracts stress buckle includes a lateral cable mounting portion and a transition chain mounting portion, wherein the transition chain mounting portion includes a fit portion, a first upper limiting portion which is disposed above the fit portion, and a first lateral limiting portion which connects the fit portion and the first upper limiting portion at one end of the fit portion; the lateral cable mounting portion is disposed at the other end of the fit portion; the transition chain mounting portion is provided with two mounting holes; the mounting holes shrink to form strip-shaped holes; each one of the strip-shaped hole includes a fit section which is disposed at the fit portion and a lateral limiting section which is disposed at the first lateral limiting portion, characterized in that at least one of the strip-shaped holes formed through shrinking of the mounting holes gradually inclines outward in a direction away from the lateral cable mounting portion from a position close to the lateral cable mounting portion.

As an option, the mounting holes are formed on the fit portion, the strip-shaped holes formed through shrinking of the mounting holes extend from the fit portion to the first upper limiting portion via the first lateral limiting portion.

A diagonal angle pearl chain includes two horizontal lateral cables, a transition chain which is longitudinally disposed between two lateral cables, and connectors which connect the lateral cables and the transition chain, characterized in that each one of the connectors includes subtracts stress buckles; the transition chain in connection with the lateral cables through the subtracts stress buckles has two ends which are respectively provided with a transition chain mounting piece, wherein each one of the transition chain mounting pieces includes a first limiting portion, and each one of the first limiting portions passes through each corresponding one of the mounting holes and then is limited in each corresponding one of the transition chain mounting portions.

As an optimization, each one of the transition chain mounting pieces also includes a second limiting portion and a connecting pole, wherein each one of the second limiting portions is disposed on one side of each one of the transition chain mounting pieces, and each one of the connecting poles passes through each corresponding one of the first lateral limiting portions via each corresponding one of the strip-shaped poles, and connects each corresponding one of the first limiting portions and each corresponding one of the second limiting portions.

As an optimization, a first connecting assembly is disposed at each one of two ends of each one of the lateral cables, wherein one of the lateral cables is ruptured at a certain position wherein a second connecting assembly is disposed; each one of the connectors includes subtracts stress buckles which connect the lateral cables and the transition chain on two sides of the second connecting assembly, wherein the mounting hole, close to the second connecting assembly, of each one of the subtracts stress buckles shrinks to form a strip-shaped hole which gradually approaches the second connecting assembly in a direction away from the lateral cable mounting portion from a position close to the lateral cable mounting portion.

As an optimization, the transition chain includes stress reducing transition chains which are connected with the lateral cables through the subtracts stress buckles on two sides of the second connecting assembly; each one of the subtracts stress buckles includes a steel cable which is disposed between the transition chain mounting pieces; on each one of the steel cables, a stress reducing limiting piece is fixedly disposed at a position isolated from each one of the transition chain mounting pieces, and a non-slip piece is provided between the two stress reducing limiting portions.

As an optimization, at each one of the two ends of each one of the steel cables, the length of the stress reducing section between each one of the stress reducing limiting pieces and each corresponding one of the transition chain mounting pieces is 20-60 mm.

As an option, the mounting holes are formed on the fit portion, and the strip-shaped holes formed through shrinking of the mounting holes extend from the fit portion to the first upper limiting portion via the first lateral limiting portion.

As an optimization, the transition chain is disposed in a "Z" shape between two lateral cables.

As an optimization, a tightening device is also included, wherein the tightening device includes an elastic tightening ring and a plurality of tightening ring connectors which are disposed along the circumference of the tightening ring; the tightening ring connectors connect the lateral cables such that the lateral cables which form closed round loops on the lateral faces of the tire are tightened toward the interior of the closed round loops.

For the transition chains on two sides of each one of the connecting assemblies, the roots of the connectors of the steel cables thereof receive not only stress in the length-wise direction that is applied by the non-slip piece when the vehicle is running, and but also receive the locking stress in the tangential direction that is applied by the second connecting assembly; stresses from multiple directions act at the roots of the connectors on the steel cables such that the stress at the roots of the connectors on the steel cables increase dramatically, easily resulting in rupture and reducing the service life of the whole product. In the present invention, the connectors on each one of the two sides of the second connecting assembly are subtracts stress buckles of which the mounting holes close to the second connecting assemblies shrink to form strip-shaped holes, and the strip-shaped holes gradually approach the second connecting assemblies in a direction away from the lateral cable mounting portions from positions close to each corresponding lateral cable mounting portion. In this way, the huge horizontal shear force on the steel cables is relieved when the tire is rolling, the mutual friction between the roots of the steel cables of the transition chains and the subtracts stress buckles at the position is reduced, and the service life of the steel cables is prolonged.

Relevant technical persons who work for the applicant have done experiments repeatedly, and results show that the diagonal angle pearl chain of the present invention has its service life prolonged to 2,000 km on snowfields at the speed of 50 km/h.

In conclusion, in the present invention, the subtracts stress buckle and stress reducing transition chain that are disposed on each of the two sides of the second connecting assembly isolate, disperse, and relieve the concentrated stress at the roots of the connector of the steel cable of the stress reducing transition chain, thus prolonging the service life of the steel. Meanwhile, the present invention also has the advantages of simple structure, stable performance, convenient modification and low manufacturing cost.

DETAILED DESCRIPTION OF THE INVENTION

The implementation mode of the utility model is described in detail below in conjunction with the attached drawings.

Figure 3:
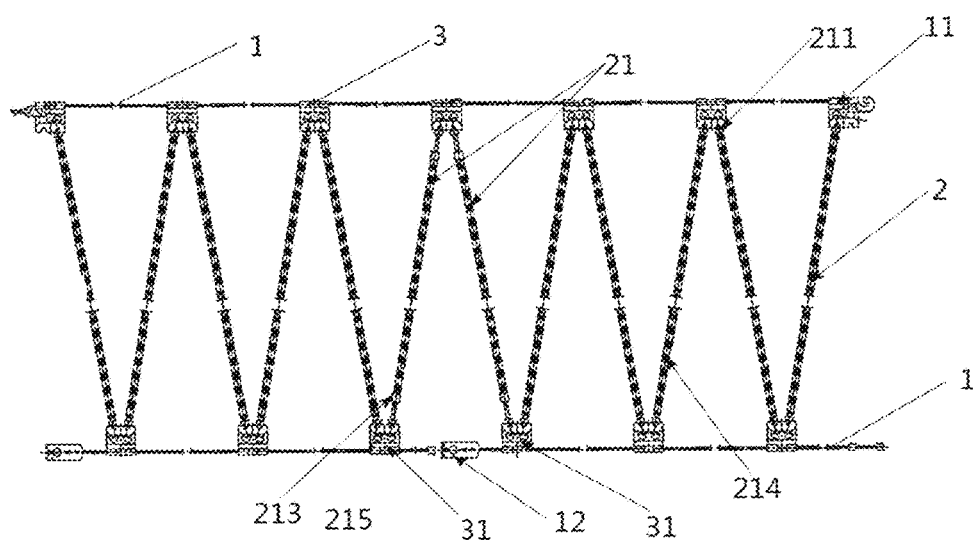
FIG. 3 is a structural view of a diagonal angle pearl chain in the expanded state.

A diagonal angle pearl chain, as shown in FIG. 3, which includes two horizontal lateral cables 1 which are basically parallel to each other, and a transition chain 2 which is disposed in a "Z" shape between the two lateral cables 1 and is connected with the two lateral cables 1. The transition chain 2 and the lateral cables 1 are connected through the connectors 3.

Figure 2:
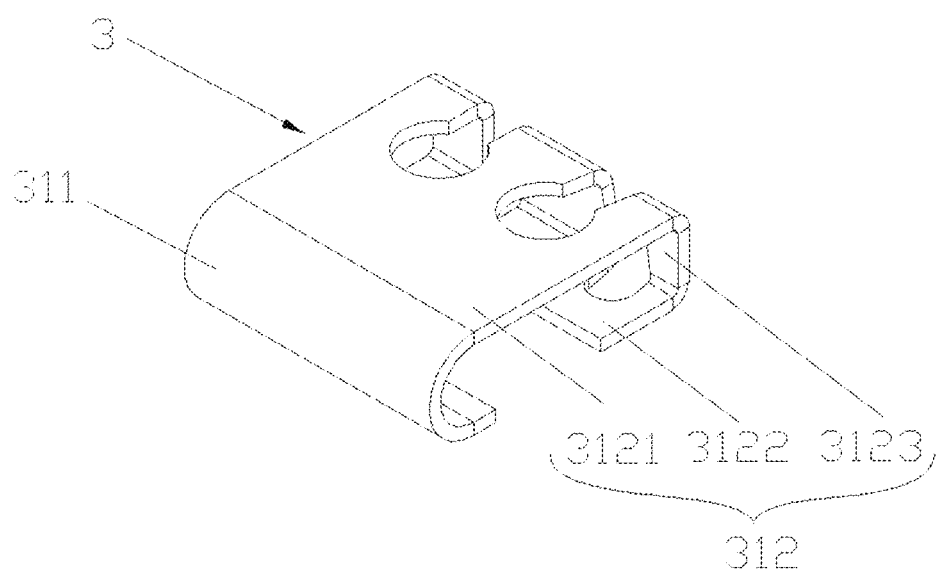
FIG. 2 is a lateral view of the diagonal angle pearl chain subtracts stress buckle.

As shown in FIG. 2, the connectors 3 are connecting pinch plates. Each one of the connectors includes a lateral cable mounting portion 311 and a transition chain mounting portion 312. Each one of the transition chain mounting portions 312 includes a fit portion 3121, a first upper limiting portion 3122 disposed above the fit portion 3121, and a first lateral limiting portion 3123 which connects the fit portion 3121 and the first upper limiting portion 3122 at one end of the fit portion 3121, forming a U-shaped limiting structure. Each one of the lateral cable mounting portions 311 is a lateral cable mounting groove disposed at the other end of each one of the fit portions 3121, and each one of the lateral cables 1 passes through each corresponding one of the lateral cable mounting grooves and is installed in each corresponding one of the connecting pinch plates. Each one of the fit portions 3121 is provided with two mounting holes 3124 in parallel, and can be connected with two transition chains 2 at the same time. Each one of the mounting holes 3124 shrinks to form a strip-shaped hole 3125, and each one of the strip-shaped holes 3125 extends from each corresponding one of the first lateral limiting portions 3123 to each corresponding one of the first upper limiting portions 3122 via each corresponding one of the fit portions 3121.

Figure 5:
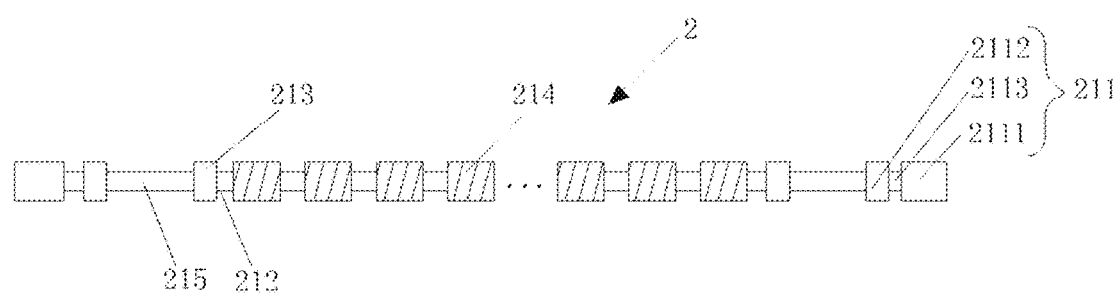
FIG. 5 is a schematic view of the connection between the transition chain and the connector.

Each one of the transition chains 2 includes a steel cable 212 which is provided with a non-slip piece 214, and a transition chain mounting piece 211 which is disposed at each one of the two ends of the steel cable 212; the non-slip pieces 214 can be steel plates or steel wire coiled balls; and each one of the steel cables passes through the axial center of each corresponding one of the non-slip pieces 214 and is connected with each corresponding one of the non-slip pieces 214. Each one of the transition chain mounting pieces 211 includes a relatively large first limiting portion 2111 and a relatively large second limiting portion 2112 that are respectively positioned at two ends, and a relatively thin connecting pole 2113 which connects the first limiting portion 2111 and the second limiting portion 2112. Each one of the first limiting portions 2111 is positioned at one end of each corresponding one of the transition chains 2, and each one of the second limiting portions 2112 is close to the middle of each corresponding one of the transition chains 2 with respect to each corresponding one of the first limiting portions 2111. The aperture of each one of the mounting holes 3124 should be big enough such that each corresponding one of the first limiting portions 2111 can pass through. The size of each one of the strip-shaped holes 3125 formed by shrinking each one of the mounting holes 3124 should be between the size of each one of the connecting pole 2113 and the size of each one of the first limiting portions 2111, so that each one of the relatively large first limiting portions 2111 cannot pass through each corresponding one of the strip-shaped holes 3125, while each one of the relatively thin connecting poles 2113 can pass through each corresponding one of the strip-shaped holes 3125 and move in each corresponding one of the strip-shaped holes 3125, as shown in FIG. 5.

A first connecting assembly 11 is disposed at each one of the two ends of each one of the lateral cables 1, one of the lateral cables 1 (Hereinafter referred to as "outside cable") is ruptured in the middle at a certain position where a second connecting assembly 12 is disposed. On the outside cable, the connecting pinch plates on two sides of each one of the second connecting assemblies 12 are subtracts stress buckles 31. Between the two lateral cables 1, the transition chains 2 on two sides of each one of the second connecting assemblies 12 are stress reducing transition chains 21.

Figure 1:
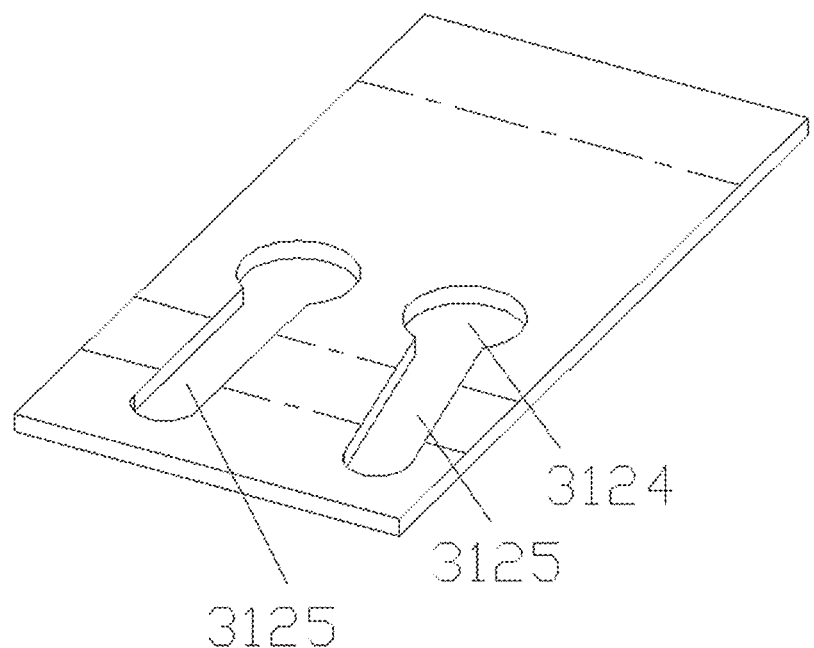
FIG. 1 is a structural view of a diagonal angle pearl chain subtracts stress buckle in an expanded state.

On each one of the subtracts stress buckles 31, the strip-shaped hole 3125 formed by shrinking of the mounting hole 3214 close to the second connecting assembly 12 gradually inclines outward (namely approaches the side of the second connecting assembly 12) in a direction away from the lateral cable mounting portion 311 from a position close to the lateral cable mounting portion 311, wherein the inclination angle is related to the diameter and running speed of a tire that uses the diagonal angle pearl chain, and can be designed and adjusted upon specific situations in use; the strip-shaped hole formed by shrinking the other mounting hole 3124 basically extends linearly in a direction away from the lateral cable mounting groove 311 from a position close to the lateral cable mounting groove 311. FIG. 1 is a schematic view of the diagonal angle pearl chain subtracts stress buckle in an expanded state. The first limiting portion 2111 of each one of the transition chain mounting pieces 211 of each one of the stress reducing transition chains 21 passes through the mounting holes 2124 of each corresponding one of the subtracts stress buckles 31 such that each one of the transition chain mounting pieces 211 is in a clamped connection with the transition chain mounting portion 312 of each corresponding one of the subtracts stress buckles 31; and the transition chain mounting piece 211 at the other end of each one of the stress reducing transition chains 21 is in a clamped connection with the connecting plates on the inside cable in the same way as described above.

As shown in FIG. 3, a stress reducing limiting portion 213 is disposed at the inner side of the transition chain mounting piece 211 which is disposed at each one of the two ends of the steel cable of each one of the stress reducing transition chains 21. The stress reducing limiting portions 213 can be steel round balls with a length of some 8-12 mm. On each one of the steel cables 212, each one of the steel round balls and the transition chain mounting piece 211 on the outer side thereof form a stress reducing section 215 with a length of some 20-60 mm. The outer diameter of each one of the steel round balls is greater than the inner diameter of each corresponding one of the non-slip pieces 214 to limit the movement space of each corresponding one of the non-slip pieces 214 on each corresponding one of the steel cables 212, namely the portion between the two steel round balls. On the one hand, each one of the non-slip pieces 214 is isolated from the roots of the transition chain mounting pieces 211 of each one of the steel cables 212, reducing the stress at the roots of the transition chain mounting pieces 211 of each one of the steel cables 212, and prolonging the service life of the steel cables 212. On the other hand, the transition chains 21 on two sides of each one of the second connecting assemblies 12 receive the transverse stress that is applied by each one of the second connecting assemblies 12 and the longitudinal stress that is applied by each one of the pinch plates, so the non-slip effect is decreased.

The connecting pinch plates are expanded semi-finished products that are formed through the steps of punching and boring steel plates, and bending the two ends of each one of the steel plates upward first and then toward the middle of each one of the steel plates. Then, each one of the lateral cables 1 is placed in the U-shaped limiting structure of each one of the lateral cable mounting portions 311, and press-fit toward each corresponding one of the fit portions 3121 such that each one of the lateral cables 1 is limited in each corresponding one of the lateral cable mounting grooves.

Then, connections between the transition chains 2 and the connecting pinch plates are carried out in the following way.

The first limiting portion 2111 of each one of the transition chain connectors 211 passes through each corresponding one of the mounting holes 3124 through each corresponding one of the fit portions 3121, and each one of the connecting poles 2113 is positioned in each corresponding one of the strip-shaped holes 3125. Each one of the fit portions 3121 moves to each corresponding one of the first lateral limiting portions 3123 such that each one of the first limiting portions 2111 is placed in the U-shaped limiting structure that is surrounded by each corresponding one of the fit portions 3121, each corresponding one of the first upper limiting portions 3122 and each corresponding one of the first lateral limiting portions 3123. Each one of the first upper limiting portions 3121 is press-fit toward each corresponding one of the fit portions 3121 to limit each one of the first limiting portions 2111 in each corresponding one of the transition chain mounting portions 312. At this time, each one of the limiting portions 211 and each one of the second limiting portions 212 are respectively disposed on the inner and outer sides of each corresponding one of the first lateral limiting portions 333, and each one of the connecting poles 213 passes through each corresponding one of the strip-shaped holes 334 to connect each corresponding one of the first limiting portions 211 and each corresponding one of the second limiting portions 212, completing the connection between each one of the transition chains 3 and each corresponding one of the connectors 2.

Figure 4:
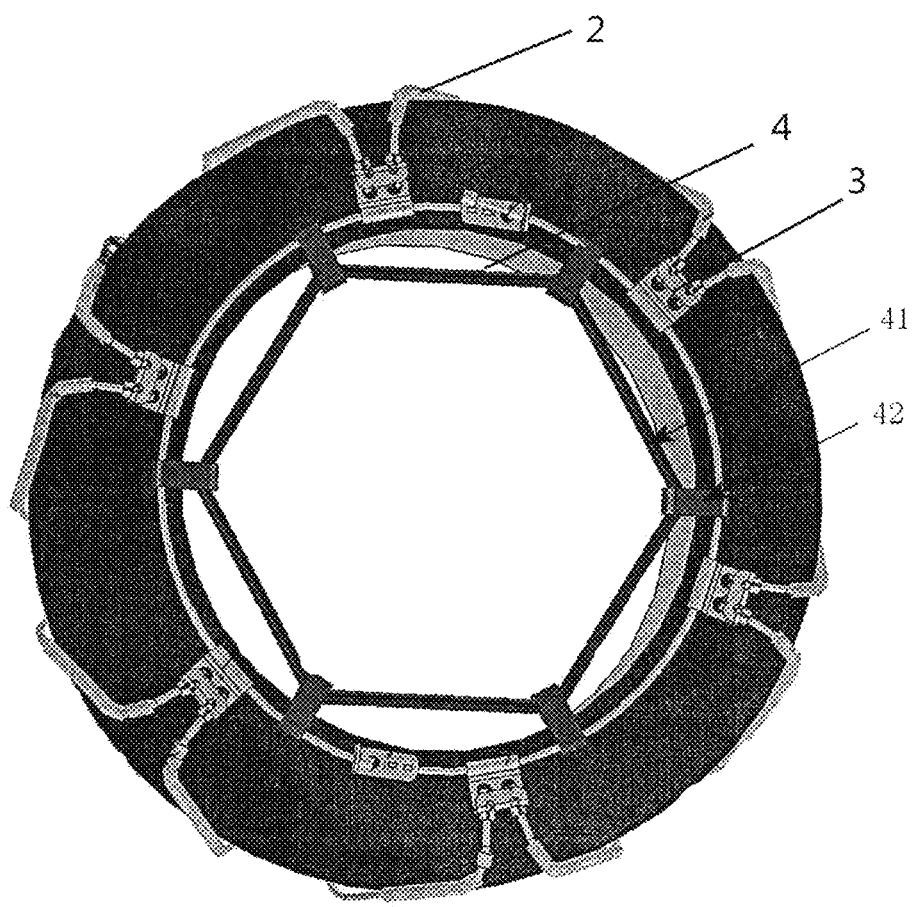
FIG. 4 is a schematic view of the diagonal angle pearl chain installed on a tire.

When the diagonal angle pearl chain is assembled on a tire, as shown in FIG. 4, the first connecting assembly 11 at each one of the two ends of one of the inside cable (the cable near the inner side of the tire) and the outside cable is disconnected, and the second connecting assembly 12 in the middle of the outside cable is also disconnected, so that the diagonal bead chain on the inner side of the tire expands on the pavement. Then, the two interface ends of the second connecting assembly 12 of the outside cable separately wind around the part of the tire that contacts the pavement and moves from the inner side to the outer side of the tire. The two ends of the inside cable on the inner side of the tire are pulled first to ensure external connection with the inner wall of the tire and then are connected end to end at the tire top or at a position close to the tire top, and the two ends of the inside cable are connected end to end through the first connecting assembly 11 at the top. Then, similarly, the first connecting assemblies at the two outer ends of the outside cable are connected from the front and rear of the tire to ensure external connection with the outside wall of the tire. Next, the second connecting assembly 12 of the outside cable is connected end to end such that the outside cable forms a closed cable loop. A tightening device 4 for tightening the closed cable loop which is formed by the outside cable and the inside cable is respectively provided on the outside wall and inside wall of the tire. The tightening device 4 includes an elastic tightening ring 41 and a plurality of tightening ring connectors 42 which are disposed along the circumference of the tightening rings 41. The tightening ring connectors 42 connect the lateral cables 1 such that the lateral cables 1 which are closed round rings formed on the lateral face of the tire are tightened toward the interior of the closed cable loops.

The subtracts stress buckles 31 can also be designed in the following way: the strip-shaped holes formed by reducing the two mounting holes both gradually incline outward in a direction away from the lateral cable mounting portions from positions close to the lateral cable mounting portions (the space between the two mounting holes is defined as the "inside" and the spaces outside the mounting holes are defined as the "outside").

The connectors on two sides of the second connecting assembly 12 of the diagonal angle pearl chain are subtracts stress buckle, and the connectors at other positions on the diagonal angle pearl chain are also subtracts stress buckles.

In the present invention, the connectors on each one of the two sides of the second connecting assembly are subtracts stress buckles of which the mounting holes close to the second connecting assemblies reduce to form strip-shaped holes, and the strip-shaped holes gradually approach the second connecting assemblies in the direction away from the lateral cable mounting portions from positions close to the lateral cable mounting portions. In this way, the huge horizontal shear force on the steel cables is relieved when the tire is rolling, the mutual friction between the roots of the steel cables of the transition chains and the subtracts stress buckles at the position is reduced, and the service life of the steel cables is prolonged. Meanwhile, the two ends of each one of the stress reducing transition chains of the second connecting assembly are respectively reserved with a stress reducing section with a certain length at the root position of each one of the transition chain mounting pieces, so that the stress which is originally concentrated at the root position of each one of the transition chain mounting pieces is dispersed and transferred to the whole stress reduction section. The stress is dispersed to all parts of the stress reducing section, greatly relieving stress concentration at the roots of the transition chain mounting pieces of the steel cables. In addition, the stress reducing limiting pieces of each one of the stress reducing transition chains limits the movement scope of the non-slip pieces between the stress reducing limiting pieces at the two ends such that the non-slip pieces are separated from the transition steel cable at the roots of the transition chain mounting pieces, preventing the non-slip pieces from extruding the roots of the transition chain mounting pieces on the steel cable, and relieving the stress at the roots of the transition chain mounting pieces of the steel cable. The service life of the steel cable is prolonged respectively from the above three aspects.

The embodiments of the present invention are depicted in conjunction with the attached drawings, but a person skilled in the art can make various modifications and changes within the scope of the attached claims.

What is claimed is:

1. A subtracts stress buckle, comprising a lateral cable mounting portion and a transition chain mounting portion, wherein the transition chain mounting portion comprises a fit portion, a first upper limiting portion which is disposed above the fit portion, and a first lateral limiting portion which connects the fit portion and the first upper limiting portion at one end of the fit portion; the lateral cable mounting portion is disposed at the other end of the fit portion; the transition chain mounting portion is provided with two mounting holes, wherein each one of the mounting holes shrinks to form a strip-shaped hole, each one of the strip-shaped holes includes a fit section which is disposed at the fit portion and a lateral limiting section disposed at the first lateral limiting portion, wherein at least one of the strip-shaped holes formed by shrinking one of the mounting holes gradually inclines outward in a direction away from the lateral cable mounting portion from a position close to the lateral cable mounting portion; the mounting holes (3124) are formed on the fit portion (3121), and the strip-shaped holes (3125) formed through shrinking of the mounting holes (3124) extend to the first upper limiting portion (3122) from the fit portion (3121) via the first lateral limiting portion (3123).

2. A diagonal angle pearl chain, comprising two horizontal lateral cables, a transition chain which is longitudinally disposed between two lateral cables, and connectors for connecting the lateral cables and the transition chain, wherein each one of the connectors comprises the subtracts stress buckles according to claim 1; the transition chain (2) compromises a stress reducing transition chain (21) which is connected with the lateral cables (1) through the subtracts stress buckles, the stress reducing transition chain (21) has two ends respectively provided with a transition chain mounting piece, wherein each one of the transition chain mounting pieces comprises a first limiting portion, and each one of the first limiting portions passes through each corresponding one of the mounting holes and then is limited in the transition chain mounting portion.

3. The diagonal angle pearl chain according to claim 2, wherein each one of the transition chain mounting pieces also comprises a second limiting portion and a connecting pole; each one of the second limiting portions is disposed on one side of each one of the transition chain mounting pieces; each one of the connecting poles passes through each corresponding one of the first lateral limiting portions via each corresponding one of the strip-shaped holes, and connects each corresponding one of the first limiting portions and each corresponding one of the second limiting portions.

4. The diagonal angle pearl chain according to claim 2, wherein a first connecting assembly is disposed at each of the two ends of each one of the lateral cables, wherein one lateral cable is ruptured at a certain position where a second connecting assembly is provided; each one of the connectors comprises the subtracts stress buckles which are respectively disposed on two sides of each one of the second connecting assemblies and connect each corresponding one of the lateral cables and the stress reducing transition chain (21), and the strip-shaped hole (3125) which is formed by shrinking one of the mounting holes, close to each corresponding one of the second connecting assemblies, of each one of the subtracts stress buckles (31) gradually approaches each corresponding one of the second connecting assemblies in a direction away from the lateral cable mounting portion from a position close to the each corresponding one of the lateral cable mounting portions.

5. The diagonal angle pearl chain according to claim 2, wherein the transition chain comprises a stress reducing transition chain which is connected with the lateral cables through the subtracts stress buckles on two sides of each one of the second connecting assemblies; each one of the stress reducing chains comprises a steel cable which is disposed between the transition chain mounting pieces; on each one of the steel cables, a stress reducing limiting piece is fixedly provided at a position isolated from each one of the transition chain mounting pieces, and a non-slip piece is disposed between two stress reducing limiting pieces.

6. The diagonal angle pearl chain according to claim 5, wherein at each one of the two ends of each one of the steel cables, the length of a stress reduction section between the stress reducing limiting portion and the transition chain mounting piece is 20-60 mm.

7. The diagonal angle pearl chain according to claim 2, wherein the transition chain is disposed in a "Z" shape between the two lateral cables.

8. The diagonal angle pearl chain according to claim 2, wherein the chain further comprises a tightening device, wherein the tightening device comprises an elastic tightening ring (41) and a plurality of tightening ring connectors (42) which are disposed along the circumference of the tightening ring (41); the tightening ring connectors (42) connect the lateral cables such that the lateral cables which form closed round loops on the lateral sides of the tire are tightened toward the interior of the closed round loop.

\* \* \* \* \*